United States Patent [19]

Sedbrook et al.

[11] Patent Number: 5,796,549
[45] Date of Patent: Aug. 18, 1998

[54] UNIVERSAL BOND PAD CONFIGURATION

[75] Inventors: Darreyl S. Sedbrook, Rosemount; Brian D. Strayer, Minneapolis, both of Minn.

[73] Assignee: Seagate Technology, Inc., Scotts Valley, Calif.

[21] Appl. No.: 729,786

[22] Filed: Oct. 8, 1996

Related U.S. Application Data

[60] Provisional application No. 60/020,681, Jul. 3, 1996.

[51] Int. Cl.$^6$ ................................................ G11B 5/60
[52] U.S. Cl. ........................................................ 360/103
[58] Field of Search ........................... 360/103, 104, 360/126; 29/603.07

[56] References Cited

U.S. PATENT DOCUMENTS

| | | | |
|---|---|---|---|
| 4,789,914 | 12/1988 | Ainslie et al. | 360/103 |
| 4,893,203 | 1/1990 | Ezaki et al. | 360/103 |
| 4,992,897 | 2/1991 | Deroux-Dauphin | 360/103 |
| 5,001,591 | 3/1991 | Nakashima | 360/126 |
| 5,020,213 | 6/1991 | Aronoff et al. | 29/603 |
| 5,068,759 | 11/1991 | Matsuzaki | 360/103 |
| 5,126,901 | 6/1992 | Momoi et al. | 360/103 |
| 5,126,903 | 6/1992 | Matsuzaki | 360/104 |
| 5,187,623 | 2/1993 | Ibaraki | 360/103 |
| 5,200,869 | 4/1993 | Matsuzaki | 360/103 |
| 5,220,471 | 6/1993 | Matsuzaki | 360/103 |
| 5,293,288 | 3/1994 | Ishikawa et al. | 360/103 |
| 5,331,489 | 7/1994 | Johnson et al. | 360/104 |

FOREIGN PATENT DOCUMENTS

| | | | |
|---|---|---|---|
| 60-246015 | 12/1985 | Japan | 360/103 |
| 61-9812 | 1/1986 | Japan | 360/103 |
| 61-148622 | 7/1986 | Japan | 360/103 |
| 61-160815 | 7/1986 | Japan | 360/103 |
| 61-243993 | 10/1986 | Japan | 360/103 |

OTHER PUBLICATIONS

IBM Technical Disclosure Bulletin, "Multilayer Ceramic Slider for Thin-film Heads", vol. 15, No. 7, Dec. 1972, pp. 2183–2184.

*Primary Examiner*—Stuart S. Levy
*Assistant Examiner*—Kevin M. Watkins
*Attorney, Agent, or Firm*—Kinney & Lange, P.A.

[57] ABSTRACT

A thin film magnetic head includes a slider having a transducer and a plurality of bond pads disposed on an end surface of the slider. Each bond pad has a first portion configured and arranged relative to a second portion so that the first portion is substantially perpendicular to the second portion. This arrangement provides generally perpendicular surfaces on the same bond pad that are available for connection with a conductive component from a flexure assembly, which is connected to a top surface of the slider. The first portion of the bond pads has a generally vertical orientation while the second portion of the bond pads has a generally horizontal orientation.

13 Claims, 2 Drawing Sheets

UNIVERSAL BOND PAD CONFIGURATION

This application claims the benefit of U.S. Provisional Application No. 60/020,681, filed 7/3/96.

BACKGROUND OF THE INVENTION

The present invention relates to mounting and connection systems for thin film magnetic heads in disc drives and in particular, relates to a bond pad configuration for a thin film magnetic head slider.

Most thin film magnetic head sliders include several bond pads mounted on an end surface of the slider. The bond pads provide an external surface on the slider to allow electrical connection to a transducer within the slider. These bond pads typically have either a horizonal orientation, i.e. generally parallel to an air bearing surface of the slider, or a vertical orientation, i.e. generally perpendicular to the air bearing surface of the slider. Thin film magnetic head sliders are supported over a disc surface by a flexure arm mounted to a top surface of the slider. The flexure arm carries several connecting wires for electrical connection to the bond pads of the slider. In some instances, an end of the flexure arm extends over the end surface of the slider while in other instances, the end of the flexure arm terminates on the top surface of the slider.

Sliders having horizontal bond pad configurations typically receive connecting wires extending from the flexure arm around a side surface of the slider before the connecting wire reaches the end surface of the slider in a generally horizontal orientation. Connecting wires used in a side-access method must have a length sufficient to avoid exerting a force on the slider head that would affect the flying characteristics of the slider. Accordingly, this side accessing technique can result in an excessive loop of the connecting wire hanging outward and down from the slider. This excessive loop, sometimes called "droopy loop", can cause the disc drive to crash.

FIG. 6 of U.S. Pat. No. 5,187,623 provides an illustration of the standard horizontal bond pad configuration and a modified side access technique of bonding connecting wires from the flexure arm to the horizontal bond pads. However, in this instance the flexure arm terminates on the top surface of the slider short of the end surface of the slider, and the connecting wires extend over the top surface of the slider and then directly downward to the end surface of the slider. Nevertheless, the connecting wires from the flexure arm are still forced to access the bond pads in a generally horizontal orientation since the slider has a horizontal bond pad configuration.

Sliders having vertical bond pads typically receive connecting wires of the flexure arm on the end surface directly from the top surface of the slider. In most instances, the end of the flexure arm terminates on the top surface of the slider without extending over the end surface of the slider. This arrangement permits the connecting wires of the flexure arm to extend directly to and be connected to the vertical bond pads in a generally vertical orientation. FIG. 1 of U.S. Pat. No. 5,001,591 illustrates a vertical bond pad configuration and the top-down routing of the connecting wires of the flexure arm to the bond pads.

Disc drive manufacturers typically use a flexure arm design in their disc drives that permits connection with sliders having either horizontal bond pads or vertical bond pads but not both types of bond pads. In some instances, these disc drive manufacturers desire to use a new magnetic head slider design due to improved reading/writing characteristics or improved "flying" characteristics. However, the new magnetic head slider may have a bond pad configuration (either vertical or horizontal) that is not immediately usable by the disc drive manufacturer since the slider's bond pad orientation does not match the bond pad orientation for which the existing flexure arm and associated assembly tooling (e.g., for vertical bond pads) is adapted. In these cases, the disc drive manufacturer must change its flexure arm design and/or associated assembly tooling to match the bond pad orientation of the new magnetic head slider. This changeover requires stopping production to modify the flexure arm and/or associated assembly tooling to accommodate the bond pad orientation (either horizontal or vertical) for the new magnetic head slider. In addition, existing inventories of flexure arms and thin film magnetic heads must be scrapped resulting in a significant loss in money and resources.

In some instances, a magnetic head slider design may be changed only in the type of bond pad orientation on the end surface (e.g., horizontal to vertical). Moreover, in some cases, this change in the slider design does not necessitate modifying the flexure arm design to accommodate the slider change. Nevertheless, these seemingly insignificant changes cause most disc drive manufacturers to rigorously test the new slider to insure that the slider performs the same way (i.e., qualifies) that the previous slider performed, even if the only change in the slider is the bond pad orientation. This requalification process can take up to three months. This process makes many manufacturers resistant to any changes in the slider design including changes only in bond pad orientation (e.g., horizontal to vertical).

Finally, some manufacturers may still have flexure arms and associated assembly tooling that matches bond pad orientations from earlier generations of thin film magnetic heads. These manufacturers may be reluctant to adopt a new magnetic head design if it would require modifying their flexure arm and associated assembly tooling due to a change in the bond pad orientation.

SUMMARY OF THE INVENTION

A thin film magnetic head of the present invention includes a slider having a transducer disposed therein and a plurality of bond pads disposed on an end surface of the slider. Each bond pad has a first portion and a second portion with the first portion configured and arranged to be substantially perpendicular relative to the second portion. This arrangement provides two generally perpendicular surfaces on the same bond pad that are available for connection with a conductive component of a flexure arm, which is connected to a top surface of the slider. In a preferred embodiment, the first portion of the bond pads has a generally vertical orientation while the second portion of the bond pads has a generally horizontal orientation.

This universal bond pad configuration permits conductive components from a flexure assembly to be connected to the slider in one of two ways. First, in instances in which the flexure arm requires that horizontal bond pads be used, the second generally horizontal portions of the bond pads are available for use. Second, when the flexure arm is arranged to require that vertical bond pads be used, the first generally vertical portions of the bond pads are available for use. A slider having this universal bond pad configuration can be used with most existing flexure arms and associated assembly tooling since this bond pad configuration accommodates either top down bonding with the vertical portion of the bond pads or side access bonding with the horizontal portion of the bond pads.

Accordingly, with a slider of the present invention, a new magnetic head slider can be immediately incorporated into production with only minor modifications to the flexure arm and associated assembly tooling. The existing flexure arm and associated assembly tooling can be used in the same manner as with the previous slider design (either top down bonding or side access bonding) since the universal bond pad configuration of the slider of the present invention includes both vertically and horizontally oriented bond pad surfaces. This feature avoids the prior practice of scrapping inventory of existing flexure arms and associated assembly tooling when a new magnetic slider is used in the disc drive design.

DETAILED DESCRIPTION OF THE PREFERRED EMBODIMENTS

Figure 1:
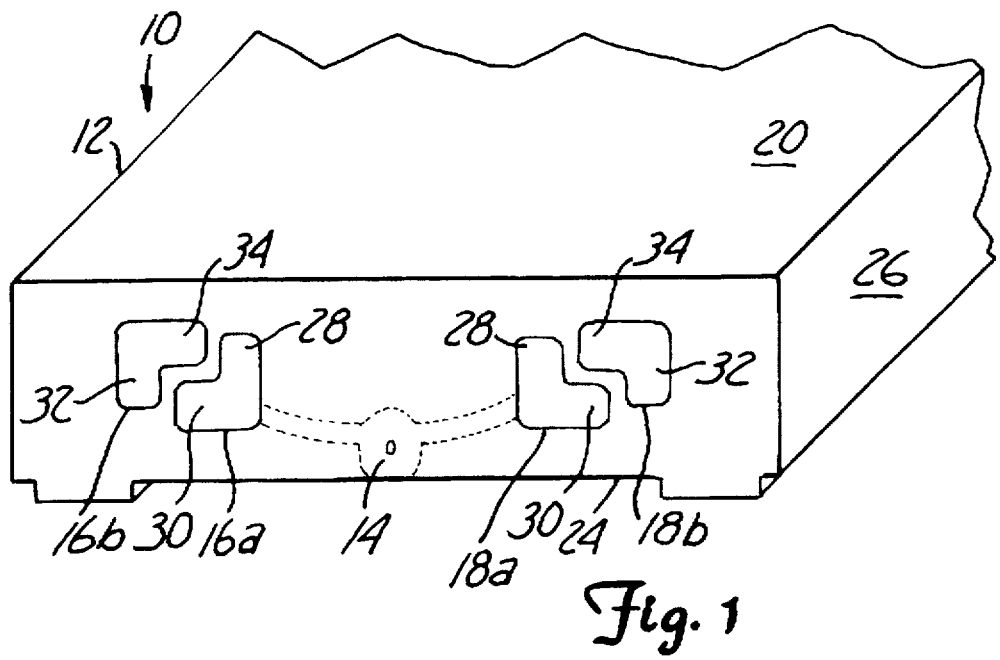
FIG. 1 is an oblique view of a portion of a slider having a bond pad configuration of the present invention.
Figure 3:
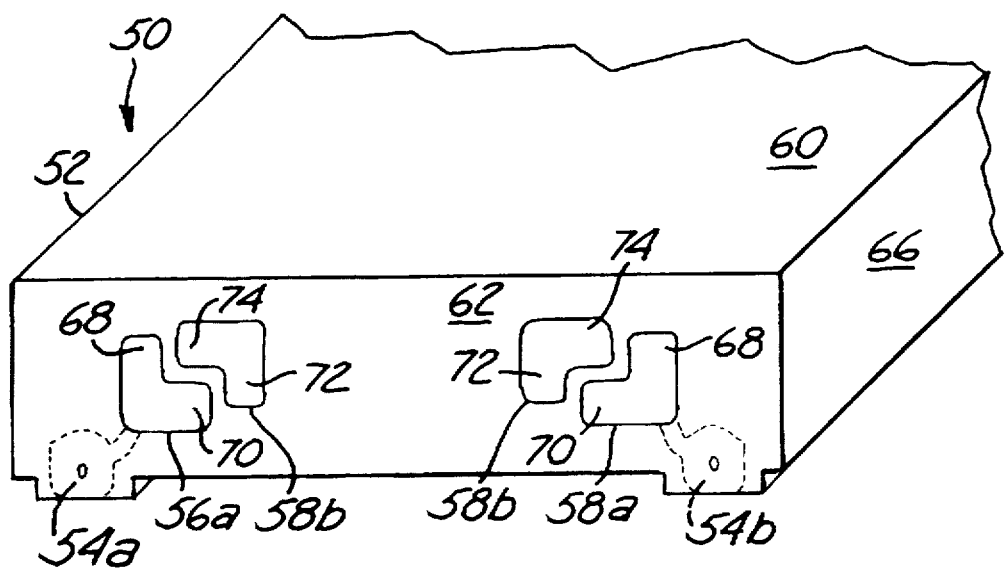
FIG. 3 is an oblique view of a portion of a slider having an alternative bond pad configuration of the present invention.

A thin film magnetic head 10 of the present invention is illustrated generally in FIG. 1. Head 10 includes slider 12, transducer 14, first pair of bond pads 16a, 16b, and second pair of bond pads 18a, 18b. Slider 12 includes top surface 20, end surface 22, air bearing surface 24, and side surfaces 26. Each bond pad 16a and 18a has first portion 28 and second portion 30 while each bond pad 16b and 18b has first portion 32 and second portion 34. Gap 36 separates bond pad 16a from bond pad 16b while gap 38 separates bond pad 18a from bond pad 18b.

Bond pads 16a, 16b and 18a, 18b are mounted on end surface 22 of slider 12 and are electrically connected to transducer 14 (e.g., reading/writing element). Each bond pad 16a and 18a has a longitudinal axis of its first portion 28 arranged substantially perpendicular to a longitudinal axis its second portion 30. Likewise, each bond pad 16b and 18b has a longitudinal axis of its first portion 32 arranged substantially perpendicular to a longitudinal axis its second portion 34. This characteristic gives each bond pad a generally L-shaped configuration. In addition, first portion 28 of each bond pad 16a and 18a has a length equal to a length of second portion 30 of bond pad 16a and 18a. As shown, first portion 32 of each bond pad 16b and 18b has a length less than a length of second portion 34 of bond pads 16b and 18b. However, the first and second portions 32 and 34 can be of equal length or vary slightly in length as necessary.

Generally L-shaped bond pad 16a is configured and arranged relative to L-shaped bond pad 16b so that, in combination, bond pads 16a and 16b form a generally rectangular shape. Likewise, generally L-shaped bond pad 18a is configured and arranged relative to L-shaped bond pad 18b so that, in combination, bond pads 18a and 18b form a generally rectangular shape. With this arrangement, the longitudinal axis of first portions 28 and 32 of the bond pads are generally parallel to each other and the longitudinal axis of second portions 30 and 34 of the bond pads are generally parallel to each other.

Moreover, the longitudinal axes of second portions 30 and 34 are generally parallel to a generally horizontal plane defining air bearing surface 24 while the longitudinal axes of first portions 28 and 32 is generally parallel to a generally vertical plane defining end surface 22. This arrangement gives first portions 28 and 32 a generally vertical orientation and second portions 30 and 34 a generally horizontal orientation. Finally, bond pad 16A is arranged symmetrically relative to bond pad 18a, and bond pad 16b is arranged symmetrically relative to bond pad 18b on opposite sides of transducer 14.

Bond pad portions 28, 30, 32 and 34 are preferably formed of gold or another suitable conductive material with each bond pad overlaying a conductive stud or connecting link that is electrically connected to the transducer. Each bond pad portion preferably has a width of about 4 millimeters and a length of about 8 millimeters. However, each bond pad portion can have a width more or less than 4 millimeters or a length more or less than 8 millimeters as necessary. Gaps 36 and 38 separate adjacent bond pads preferably by about 1.5 millimeters to insure adequate spacing for proper electrical isolation and to permit proper construction of the bond pads. However, gaps 36 and 38 can be more or less than 1.5 millimeters as necessary. These gaps 36 and 38 have approximately the same width between the entire length of all opposed inner edges of adjacent bond pads (e.g. 16a and 16b). In addition, the respective edges of bond pad portions 28, 30, 32, and 34 are spaced from the top surface 20, air bearing surface 24 and side surfaces 26 as necessary. Bond pad portions 28, 30, 32, and 34 and the underlying conductive stud structure are constructed using techniques known to those skilled in the art of using photo mask layouts for creating patterns on thin film wafers.

Figure 2:
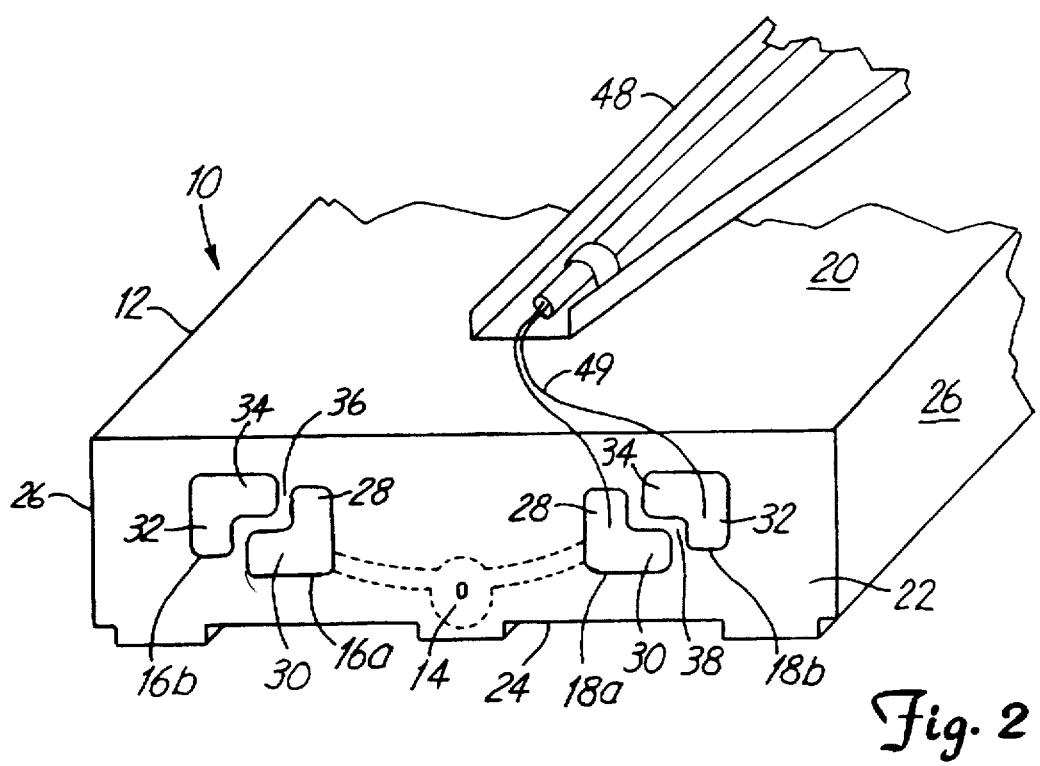
FIG. 2 is an oblique view of the slider of FIG. 1 except further including a flexure arm.

In use, thin film magnetic head 10 of the present invention is incorporated into a larger magnetic head-gimbal assembly in which a magnetic head supporting member such as a flexure arm 48 is connected to top surface 20 of slider 12, as shown in FIG. 2. Two connecting wires 49 extend from the flexure arm and are electrically connected to either bond pads 16a and 16b, or to bond pads 18a and 18b (as shown in FIG. 2). First portions 28 and second portions 30 of bond pad 16a and 18a are configured and arranged relative to each other so that, in combination, first and second portions 28 and 30 provide two generally perpendicular horizontal and vertical surfaces available as a bonding site for connection with the connecting wires of the flexure arm. Likewise, first portions 32 and second portions 34 of bond pad 16b and 18b are configured and arranged relative to each other so that, in combination, first and second portions 32 and 34 provide two generally perpendicular horizontal and vertical surfaces available for connection with the connecting wires of the flexure arm. In other words, each bond pad is formed to readily accept a connecting wire in either vertical or horizontal orientation.

Accordingly, this universal bond pad configuration permits conductive components from a flexure arm to be connected to the slider 12 in either one of two ways. First, in instances when the flexure arm and associated assembly tooling requires that horizontal bond pads be used, the generally horizontal portions 30 and 34 of either bond pads 16a and 16b or of bond pads 18a and 18b are available for use. Second, when the flexure arm and associated assembly tooling is arranged to require that vertical bond pads be used, the first generally vertical portions 28 and 32 of either bond pads 16a and 16b or of bond pads 18a and 18b are available for use. This universal bond pad configuration permits a slider to be used with most flexure assemblies, since this bond pad configuration accommodates either top down bonding with the vertically oriented portion of the bond pads or side access bonding with the horizontally oriented portion of the bond pads.

Sliders with universal bond pad configurations will reduce wasted magnetic head and flexure arm inventories that presently occur when a manufacturer switches from one slider design having a horizontal bond pad configuration to a slider design having a vertical bond pad configuration. or vice versa. In addition. sliders with universal bond pad configuration can be used with existing flexure arms (and associated assembly tooling) without significantly modifying the flexure arm and tooling. This feature is expected to significantly reduce the frequency and expense of disc drive manufacturers qualifying new slider designs for use with existing flexure arms and associated assembly tooling, since the universal bond pad includes both vertical and horizontal bond pad orientations.

Another embodiment of the thin film magnetic head of the present invention is illustrated generally in FIG. 2 at 50. Head 50 includes slider 52, a pair of transducers 54a and 54b, a first pair of bond pads 56a, 56b, and a second pair of bond pads 58a, 58b. Slider 52 includes top surface 60, end surface 62, air bearing surface 64, and side surfaces 66. Each of the bond pads 56a and 58a have first portion 68 and second portion 70 while each of the bond pads 56b and 58b have first portion 72 and second portion 74. Gap 76 separates bond pad 56a from bond pad 56b while gap 78 separates bond pad 58a from bond pad 58b.

The universal bond pad configuration of head 50 has features and attributes substantially similar to the universal bond pad configuration of magnetic head 10 except that with thin film magnetic head 50, only one pair of bond pads is associated with a single transducer. Otherwise, the bond pads 56a, 56b and bond pads 58a, 58b of magnetic head 50 have all the same features, attributes and properties of bond pads 16a, 16b and 18a, 18b of magnetic head 10.

Alternative embodiments of the present invention include rotating a pair of bond pads ninety degrees to reorient the location of the vertical and horizontal portions of the bond pads. For example, bond pads 16a and 16b can be rotated counterclockwise about ninety degrees to reorient the vertical and horizontal portions of the bond pads. This permits realigning the bond pads as necessary to facilitate bonding connecting wires to the bond pads. In addition, it is not required that a pair of bond pads (e.g., 16a and 16b) form a generally rectangular shape or that a single bond pad form a generally L-shape.

The universal bond pad configuration of the magnetic head of the present invention has numerous advantages. A slider with the bond pad configuration can be used with either flexure arms adapted for horizontal bond pads or with flexure arms adapted for vertical bond pads. The universal bond pad configuration will virtually end the current practice of automatically changing flexure arm designs and associated assembly tooling in response to new magnetic head designs since the universal bond pads will be usable with virtually any existing flexure arm design.

Although the present invention has been described with reference to preferred embodiments, workers skilled in the art will recognize that changes may be made in form and detail without departing from the spirit and scope of the invention.

What is claimed is:

1. A thin film magnetic head comprising:

a slider having an air bearing surface and an end surface;

a transducer disposed within the slider; and a plurality of L-shaped bond pads mounted on the end surface of the slider and being electrically connected to the transducer, each bond pad having a first portion and a second portion, wherein a longitudinal axis of the first portion of each bond pad is substantially perpendicular to a longitudinal axis of the second portion of the respective bond pad and wherein the first portion has a width normal to its longitudinal axis and the second portion has a width normal to its longitudinal axis the width of the first portion being substantially equal to the width of the second portion a pair of the bond pads being nested in a generally rectangular region so that an end of the first portion of each bond pad of the pair that is normal to the longitudinal axis of the first portion of the respective bond pad confronts a side of the second portion of the other bond pad of the pair that is parallel to the longitudinal axis of the second portion of the other bond pad.

2. The magnetic head of claim 1 wherein a length of the first and second portions of the bond pads of the pair are equal.

3. The magnetic head of claim 2 wherein the longitudinal axes of the second portions of the bond pads of the pair are generally parallel to a first plane defining the air bearing surface and the longitudinal axes of the first portions of the bond pads of the pair are generally parallel to a second plane defining the end surface.

4. The magnetic head of claim 2 wherein one bond pad of the pair is disposed closer to the transducer than the other bond pad of the pair.

5. The magnetic head of claim 2 wherein the slider further includes a side surface perpendicular to the air bearing surface and one bond pad of the pair is closer to the side surface than the other bond pad of the pair.

6. The magnetic had of claim 2 wherein one bond pad of the pair is disposed closer to the air bearing surface than the other bond pad of the pair.

7. The magnetic head of claim 1 wherein the longitudinal axes of the first portions of the bond pads of the pair are generally parallel to each other and the longitudinal axes of the second portions of the bond pads of the pair are generally parallel to each other.

8. The magnetic head of claim 1 wherein the plurality of bond pads includes two pairs of bond pads electrically connected to the transducer, with a first pair of bond pads being disposed on a side of the transducer opposite a second pair of bond pads, each pair of bond pads including a first bond pad and a second bond pad, each bond pad having a first portion and a second portion with a longitudinal axis of the first portion being generally perpendicular to a longitudinal axis of the second portion.

9. The magnetic head of claim 8 wherein the first bond pad of the first pair of bond pads is configured and arranged relative to the first bond pad of the second pair of bond pads so that the respective bond pads are disposed symmetrically on opposite sides of the transducer.

10. A magnetic head comprising:

a slider having an air bearing surface and an end surface;

at least one transducer disposed within the slider; and at least one pair of bond pads electrically connected to each transducer, the bond pads being mounted on the end surface of the slider with each bond pad having a first portion and a second portion, wherein a longitudinal axis of the first portion of each bond pad is substantially perpendicular to a longitudinal axis of the second portion of the respective bond pad and wherein the first portion has a width normal to its longitudinal axis and the second portion has a width normal to its longitudinal axis, the width of the first portion being substantially equal to the width of the second portion, the first portion of each bond pad is configured and arranged relative to the second portion of each bond pad to form a generally L-shaped bond pad the bond pads being nested in a generally rectangular region so that an end of the first portion of each bond pad of the pair that is normal to the longitudinal axis of the first portion of the reactive bond pad confronts a side of the second portion of the other bond pad of the pair that is parallel to the longitudinal axis of the second portion of the other bond pad.

11. A combination of a magnetic head and magnetic head supporting member comprising:

a slider having a transducer, the slider having an air bearing surface, an end surface, and a top surface opposite the air bearing surface;

a plurality of L-shaped bond pads electrically connected to the transducer and being disposed on the end surface of the slider, each bond pad having a first portion and a second portion, wherein a longitudinal axis of the first portion of each bond pad is substantially perpendicular to a longitudinal axis of the second portion of the respective bond pad and wherein the first portion has a width normal to its longitudinal axis and the second portion has a width normal to its longitudinal axis, the width of the first portion being substantially equal to the width of the second portion, a pair of the bond pads being nested in a generally rectangular region so that an end of the first portion of each bond pad of the pair that is normal to the longitudinal axis of the first portion of the respective bond pad confronts a side of the second portion of the other bond pad of the pair that is parallel to the longitudinal axis of the second portion of other bond pad;

the magnetic head supporting members connected to the top surface of the slider and having a plurality of conductive components electrically connected to the bond pads; and wherein the first portion and the second portion of each bond pad are configured and arranged relative to each other so that in combination the first and second portions provide two generally perpendicular surfaces for connection with the conductive components of the magnetic head supporting member.

12. A thin film magnetic head comprising:

a slider having an air bearing surface and an end surface;

at least one transducer disposed within the slider; and at least one pair of L-shaped bond pads electrically connected to each transducer, the bond pads being mounted on the end surface of the slider with each bond pad having a generally vertical portion and a generally horizontal portion, wherein a longitudinal axis of the generally vertical portion of each bond pad is substantially perpendicular to a longitudinal axis of the generally horizontal portion of the respective bond pad and wherein the vertical portion has a width normal to its longitudinal axis and the horizontal portion has a width normal to its longitudinal axis, the width of the vertical portion being substantially equal to the width of the horizontal portion, the bond pads being nested in a generally rectangular region so that an end of the first portion of each bond pad of the pair that is normal to the longitudinal axis of the first portion of the respective bond pad confronts a side of the second portion of the other bond pad of the pair that is parallel to the longitudinal axis of the second portion of the other bond pad.

13. A head gimbal assembly comprising:

a slider having a transducer, the slider having an air bearing surface, an end surface, and a top surface opposite the air bearing surface;

a plurality of L-shaped bond pads electrically connected to the transducer and being disposed on the end surface of the slider each bond pad having a first portion and a second portion, wherein a longitudinal axis of the first portion of each bond pad is substantially perpendicular to a longitudinal axis of the second portion of the respective bond pad and wherein the first portion has a width normal to its longitudinal axis and the second portion has a width normal to its longitudinal axis, the width of the first portion being substantially equal to the width of the second portion a pair of the bond pads being nested in a generally rectangular region so that an end of the first portion of each bond pad of the pair that is normal to the longitudinal axis of the first portion of the respective bond pad confronts a side of the second portion of the other bond pad of the pair that is parallel to the longitudinal axis of the second portion of the other bond pad;

a flexure assembly connected to the top surface of the slider and having a plurality of conductive components with the conductive components electrically connected to select bond pads;

wherein the first portion and the second portion of each bond pad are configured and arranged relative to each other so that in combination the first and second portions provide two generally perpendicular surfaces for connection with the conductive components of the flexure assembly; and wherein each conductive component is connected to only one of the first and second portions of each select bond pad.

* * * * *

UNITED STATES PATENT AND TRADEMARK OFFICE
CERTIFICATE OF CORRECTION

PATENT NO. : 5,796,549
DATED : AUGUST 18, 1998
INVENTOR(S) : DARREYL S. SEDBROOK ET AL.

It is certified that error appears in the above-identified patent and that said Letters Patent is hereby corrected as shown below:

Col. 7, line 7, delete "reactive", insert --respective--

Col. 7, line 9, delete "lo", insert --to--

Col. 7, line 32, after "portion of", insert --the--

Signed and Sealed this

Thirtieth Day of March, 1999

Attest:

Q. TODD DICKINSON

Attesting Officer

Acting Commissioner of Patents and Trademarks